(No Model.)  5 Sheets—Sheet 1.
J. FLANNERY.
HYDROCARBON GAS GENERATOR.
No. 248,439.   Patented Oct. 18, 1881.
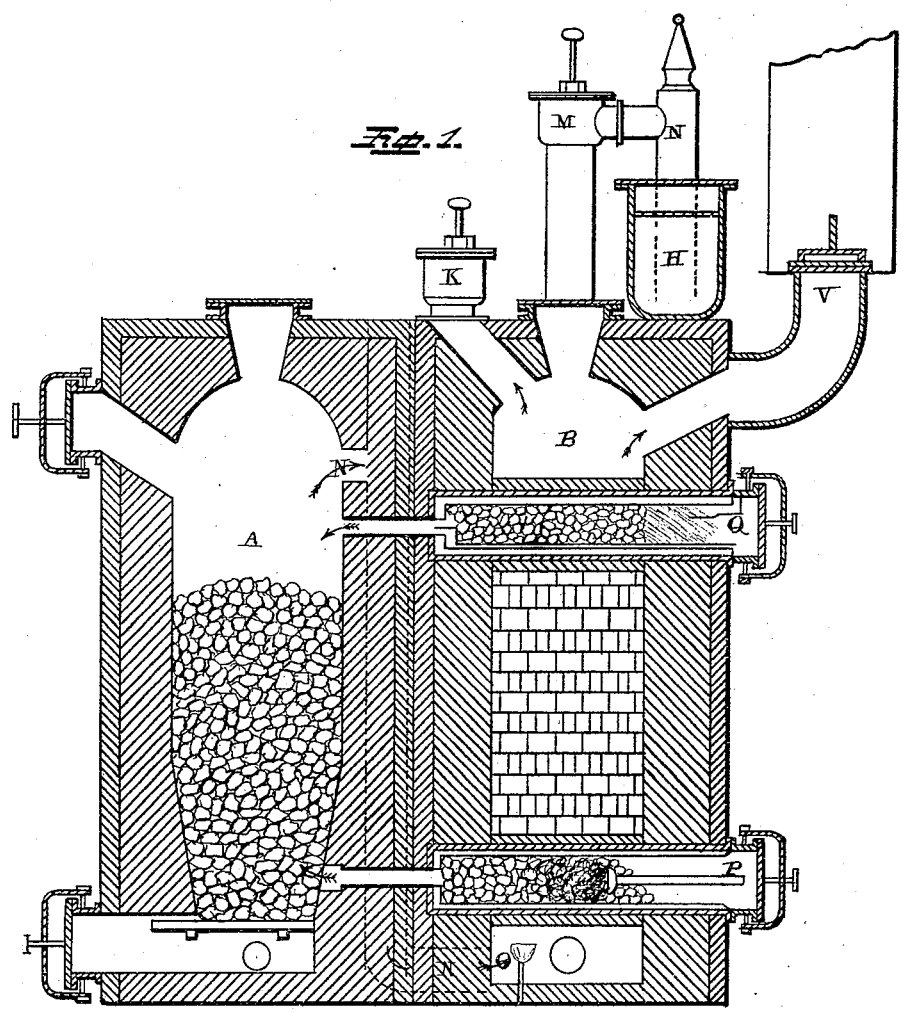

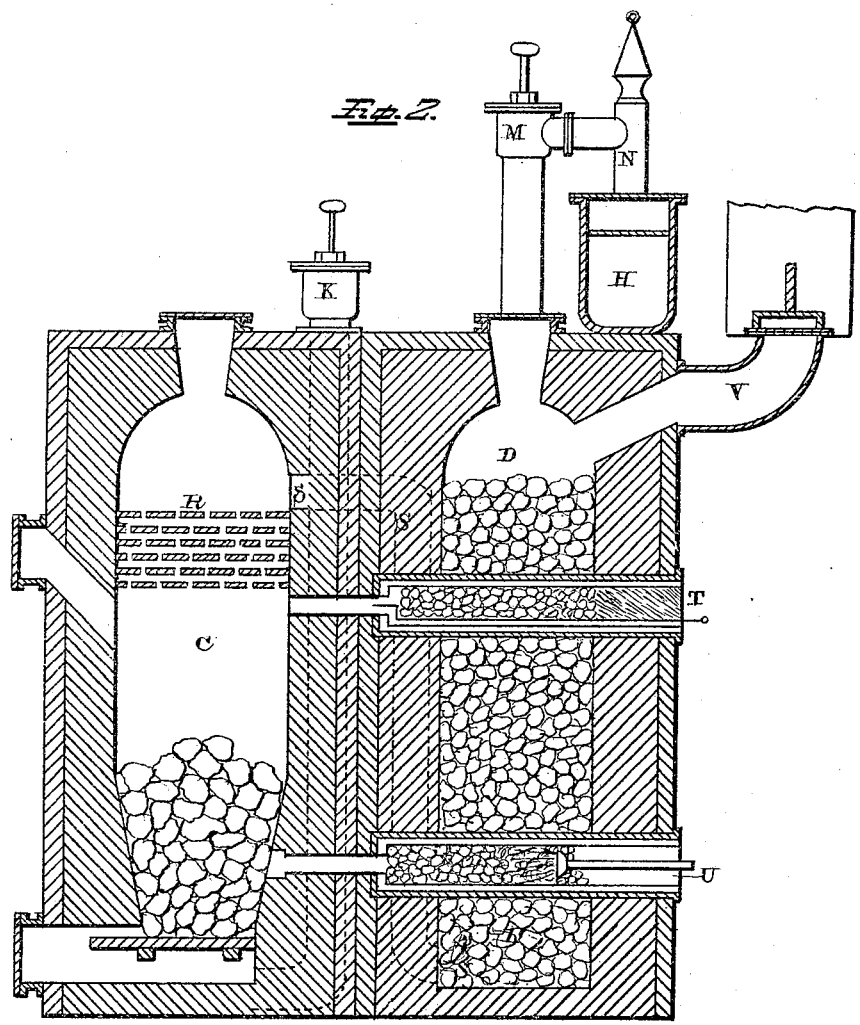

(No Model.) 5 Sheets—Sheet 3.
J. FLANNERY.
HYDROCARBON GAS GENERATOR.
No. 248,439. Patented Oct. 18, 1881.
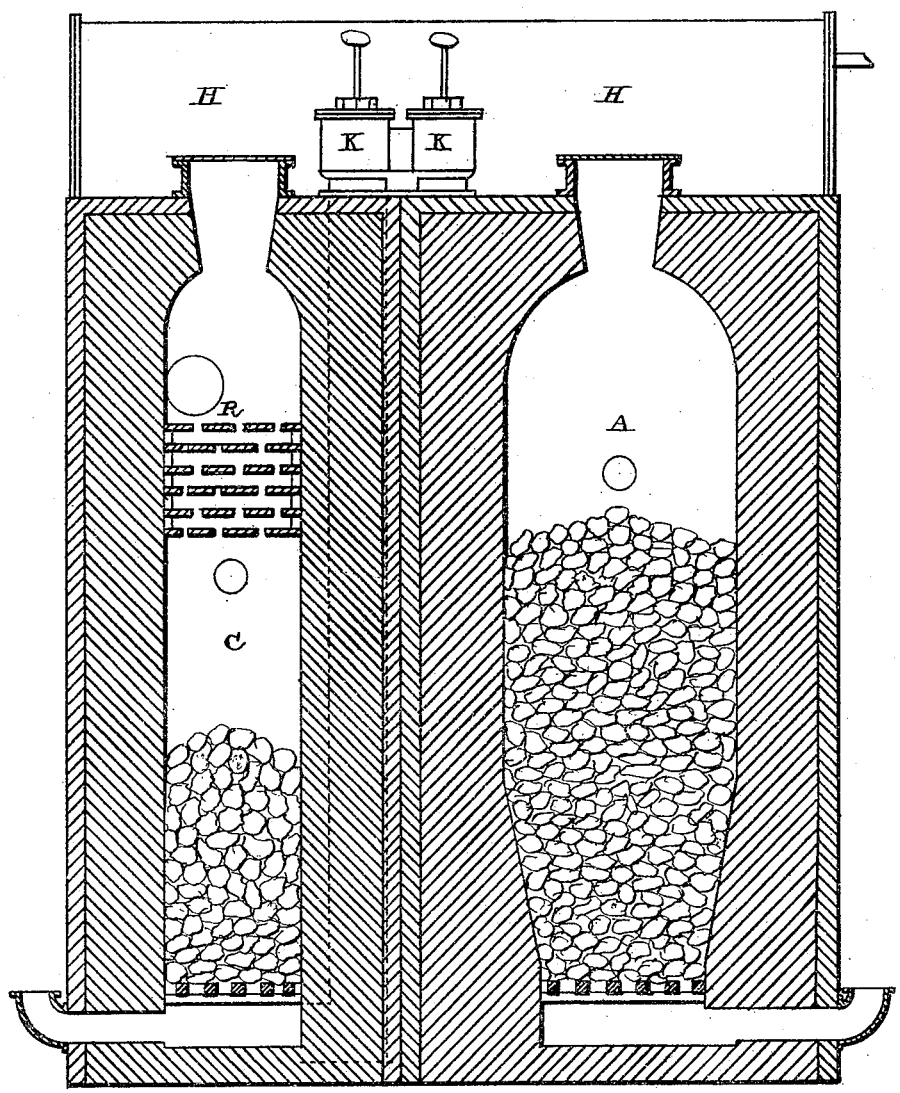

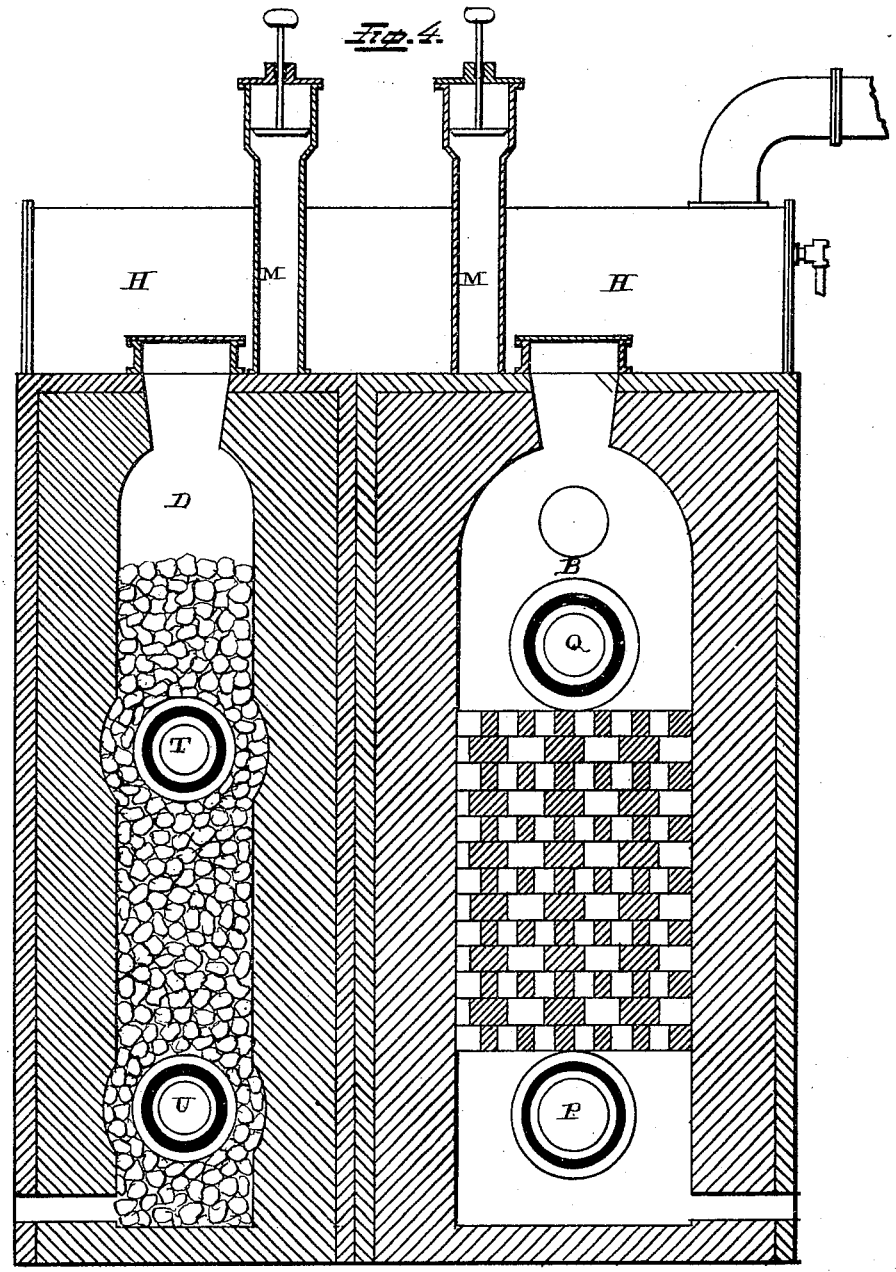

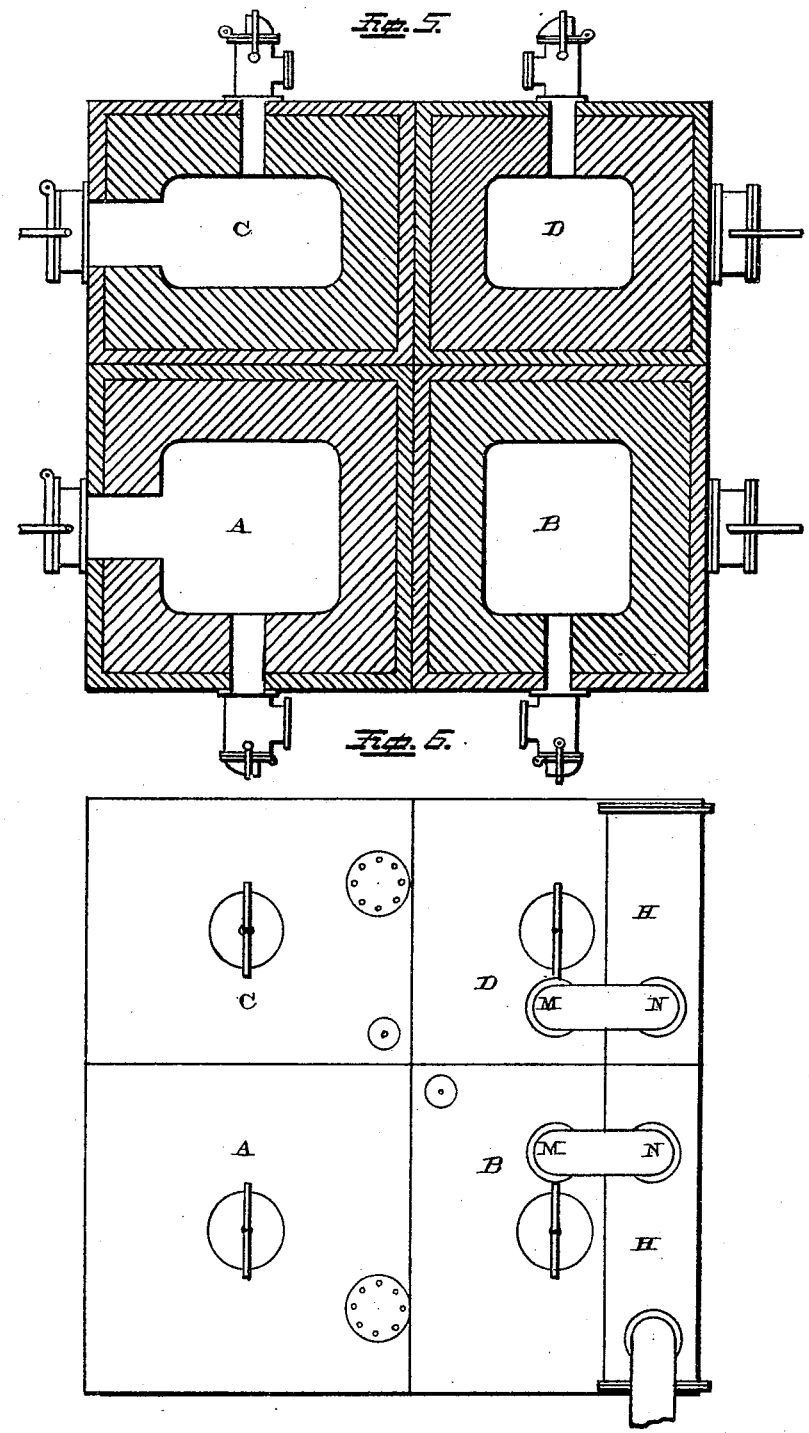

UNITED STATES PATENT OFFICE.

JOSEPH FLANNERY, OF PHILADELPHIA, PENNSYLVANIA.

HYDROCARBON-GAS GENERATOR.

SPECIFICATION forming part of Letters Patent No. 248,439, dated October 18, 1881.

Application filed April 19, 1881. (No model.)

*To all whom it may concern:*

Be it known that I, JOS. FLANNERY, of Philadelphia, in the county of Philadelphia and State of Pennsylvania, have invented certain new and useful Improvements in Hydrocarbon-Gas Generators; and I do hereby declare the following to be a full, clear, and exact description of the invention, such as will enable others skilled in the art to which it pertains to make and use it, reference being had to the accompanying drawings, which form part of this specification.

My invention relates to an improvement in hydrocarbon-gas generators, and is intended as an improvement on the patent granted to me February 8, 1881, and bearing number 237,663; and it consists in connecting the four vertical chambers together by means of internal pipes, in contradistinction to outside diagonal pipes, as shown in my former patent, whereby a great saving is effected in heat and the generating fires are placed side by side, instead of being diagonally opposite each other.

My invention further consists in igniting the carbonic-oxide gas by means of a gas jet at the point where the gas enters the retort-chamber from the generating-chamber, whereby explosions in the retort-chamber are prevented.

Figure 1 is a vertical section of my invention, taken through the chambers A B. Fig. 2 is a similar view taken through the two chambers C D. Fig. 3 is a similar view taken through the chambers A C. Fig. 4 is a similar view taken through the two chambers D B. Fig. 5 is a horizontal section taken through all four chambers. Fig. 6 is a plan view of my invention complete.

So far as the arrangement of the four chambers A B C D is concerned, which are built in the same frame-work, but separated from each other, the same arrangement is fully shown and described in the patent above referred to, and hence need not be particularly described here.

A is the generating-chamber, from which the products of imperfect combustion, in the form of carbonic oxide, carbonic-acid gas, and nitrogen, pass through the internal tube, N, into the bottom of the retort-chamber B. In the bottom of this retort-chamber B is a lighted gas-jet, O, which serves to ignite the carbonic oxide, and thus prevent its accumulation in the upper portion of the chamber and the explosions which take place from such accumulation.

The heat produced by the combustion of the carbonic-oxide gas, together with the heat from the products of imperfect combustion, are, to a great extent, absorbed by the two retorts P Q and their settings, which extend through the chamber B, as shown.

In the lower retort, which is filled with graphite or any other suitable refractory carbonaceous material, steam is injected in the form of a fine spray, and this spray, coming in contact with a larger heating-surface than it would do if injected in a solid stream, becomes decomposed. From this retort the superheated steam passes into the bottom of the generating-chamber A.

The outer end of the retort Q is filled with asbestus or other fibrous non-combustible material, through which the oil or other form of carbon is passed. By the use of this asbestus wick the oil is gradually heated as it enters the retort, and this prevents a sudden impact of the oil upon a highly-heated substance, and whereby the destructive distillation is much more perfect and complete. This retort is also filled with any suitable highly carbonaceous or other refractory material, and the gas, after leaving the retort, passes into the generating-chamber A at its top. The gases pass from the chamber B through the pipe K into the bottom of the purifying-chamber C, which has a fire of graphite or other densely-carbonaceous material made in its bottom. This pipe K is also built vertically inside of the casing of the four chambers, and, as described in my former patent, is provided with suitable valves, whereby the four chambers can be divided into two separate sets for the purpose of producing non-illuminating and illuminating gases, or both, as may be desired. The acid gas passes through the carbonaceous fire in the bottom of the chamber C, where it is freed from its sulphur compounds, and the carbonic gas is converted into carbonic oxide, and the whole more thoroughly made a fixed gas. This gas then passes up through the perforated heated plates R, where it is expanded and fixed, and from the top of this chamber C it passes through the pipe S into the bottom of the retort-chamber D, which is filled with oxide of iron ore for the purpose of deoxidizing or otherwise improving the gas. Passing horizontally through this retort-chamber D are the two retorts T U, which are similar in their construction and operation to the two retorts P Q. From the top of this chamber D the gas passes through the stand-pipe M, over through the pipe N, into the hydraulic main H, which is placed upon the top of the casting, as shown.

Where the pipes which connect the chambers are placed outside of the casing, as shown in my former patent, a very great quantity of heat is radiated from the pipes and lost, which is both inconvenient and expensive, whereas if these pipes are passed down through the casing, as here shown, they are heated by the fires in the chambers A and C, instead of parting with their heat, and the heat is confined to the chambers. Another advantage gained by thus passing the pipes down through the casing is that the fires made in the two chambers A C are in a line with each other, instead of being upon opposite sides of the case. This arrangement of parts is a very great convenience to the operator, and saves much time in walking back and forth from one to the other.

I am aware that the combustion-chamber has been connected with a retort-chamber, and that a gas-jet has been used in connection therewith; but the chambers have not been placed in the same relation to each other as shown, nor the gas-jet used at the same point or for the same purpose.

Having thus described my invention, I claim—

1. In a gas-generator, the combination of the four chambers, built side by side in the same casing with their connecting-pipes, which are built inside of the frame-work, for the purpose of preventing the radiation of heat and enabling the two generating-chambers to be placed side by side, substantially as shown.

2. In a hydrocarbon gas generator, the combination of the chamber A, the pipe N, leading from the top of this chamber into the bottom of the chamber B, and the gas-jet O, located at or near the mouth of the pipe, whereby the carbonic oxide is ignited and prevented from accumulating in the top of chamber B, substantially as described.

In testimony whereof I affix my signature in presence of two witnesses.

JOSEPH FLANNERY.

Witnesses:
F. A. LEHMANN,
WM. H. KERN.